United States Patent
Kumar et al.

(10) Patent No.: US 11,122,148 B1
(45) Date of Patent: Sep. 14, 2021

(54) METHOD AND APPARATUS FOR DETERMINING SUPPLEMENTARY PARAMETERS OF ELECTRONIC CONTENT

(71) Applicant: Rovi Guides, Inc., San Jose, CA (US)

(72) Inventors: Alok Kumar, Munnekolala (IN); Kuppappa Dandappa Harijan, Challaghatta (IN); Madhusudhan Srinivasan, Karthiknagar (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/807,070

(22) Filed: Mar. 2, 2020

(51) Int. Cl.
| | |
|---|---|
| *H04L 29/08* | (2006.01) |
| *H04L 12/58* | (2006.01) |
| *H04L 29/06* | (2006.01) |
| *G06N 5/04* | (2006.01) |
| *G06N 20/00* | (2019.01) |
| *G16Y 40/30* | (2020.01) |
| *G16Y 10/75* | (2020.01) |

(52) U.S. Cl.
CPC .............. *H04L 67/36* (2013.01); *G06N 5/04* (2013.01); *G06N 20/00* (2019.01); *H04L 51/32* (2013.01); *H04L 67/38* (2013.01); *G16Y 10/75* (2020.01); *G16Y 40/30* (2020.01)

(58) Field of Classification Search
None
See application file for complete search history.

(56) References Cited

U.S. PATENT DOCUMENTS

| | | | |
|---|---|---|---|
| 2016/0142626 A1* | 5/2016 | Bostick | H04N 5/232939 348/207.11 |
| 2017/0094018 A1 | 3/2017 | Ekström et al. | |
| 2017/0103327 A1 | 4/2017 | Penilla et al. | |
| 2017/0359417 A1* | 12/2017 | Chen | G06Q 30/01 |
| 2018/0357595 A1 | 12/2018 | Rai et al. | |

* cited by examiner

*Primary Examiner* — Jeffrey R Swearingen
(74) *Attorney, Agent, or Firm* — Haley Guiliano LLP

(57) ABSTRACT

Systems and methods for determining parameters of devices that may have influenced generated content, and appending values of these parameters to the generated content for the benefit of other users. Devices near the location at which the content was generated may be selected, and parameters of these devices may be retrieved. These device parameters are often relevant to the generated content. Accordingly, the retrieved parameter values may be appended to the generated content for transmission along with the content. In this manner, other users may view both the content and the parameters of nearby devices that may have influenced the setting of the content, assisting users in, for example, recreating the content or its subject matter for themselves.

22 Claims, 9 Drawing Sheets

METHOD AND APPARATUS FOR DETERMINING SUPPLEMENTARY PARAMETERS OF ELECTRONIC CONTENT

BACKGROUND

Embodiments of the disclosure relate generally to content creation systems. More specifically, embodiments of the disclosure relate to systems for determining supplementary parameters of created content.

SUMMARY

Contemporary electronic devices allow users to easily and quickly generate and distribute electronic content. The widespread use of electronic devices such as camera-equipped smartphones allows users to generate content almost anywhere, at a moment's notice. Devices also allow for the widespread sharing of such content through avenues such as social media, electronic mail, cloud-based voice services (e.g., Alexa), and other electronic distribution systems.

The generation and distribution of electronic content is not without its limitations, however. In particular, contemporary electronic devices typically can at most only capture images and/or audio of subjects. Without any further information, generated content often offers insufficient data to users. As one example, users may capture images of a subject such as a pet in a surrounding and, while such images may offer entertainment value, they often convey little else. For instance, viewers have no way of knowing the environmental conditions of the surrounding area, and thus cannot recreate the conditions of the image if they desire. Viewers also have no way of knowing the lighting conditions of the generated image, exact time of day, or the like, and thus cannot easily recreate the image on their own even if they wish to do so.

Accordingly, to overcome the lack of information accompanying content generated by contemporary electronic devices, systems and methods are described herein for a computer-based process that determines environmental parameters of generated content, and appends these parameters to the content for the benefit of users. Such parameters may be any relevant parameter and may include conditions present when the content was generated, such as light levels or blind settings, ambient temperature, or the like.

In one embodiment, generated electronic content or some indication of its existence is received. Other electronic devices that may provide information as to the environmental or related parameters of this content are then determined. For example, any nearby Internet of Things (IoT) sensors or devices may be selected, where selection may be based on determined locations of the device generating the content and the IoT sensors, or may be based on any IoT sensors that share the same electronic communications network with the device generating the content.

Relevant parameters including settings may then be retrieved from each of the selected sensors or devices. Such parameters may include any device settings, sensor information or the like. For instance, illumination or power levels may be received from IoT illumination sources, temperature levels may be retrieved from nearby temperature sensors, blind open/close settings may be retrieved from IoT blinds near the site of generated content, and the like. These parameters provide information describing the environmental conditions surrounding the generated content.

The retrieved device parameters and information may then be associated with the generated content, such as by appending the parameters/information to the content as, e.g., metadata. The content may then be sent to other users along with its appended metadata, so that anyone receiving such content is given useful supplemental information. This allows users to, for example, receive a picture that they may find visually pleasing, along with the location, time of day, and lighting conditions, so that users may recreate the image themselves. As another example, users may receive a picture of fish in an aquarium, along with water temperature and pH readings taken from IoT temperature and pH sensors in the aquarium, so that users may build their own aquarium safely supporting the same fish.

Generated content and its associated environmental information or surrounding parameters may be stored in a database for future use, whereupon it may be widely shared to benefit many users. Content and its associated information may be transmitted to any other electronic device in any manner and through any medium, such as by sharing as social media posts, sending to users as electronic mail, and the like.

Devices nearby generated content may often have multiple parameters including settings, only some of which may be relevant. To avoid sending users excessive parameter information that may have no relevance, embodiments of the disclosure contemplate determining one or more contexts of the generated content, and selecting only those device parameters relevant to the determined contexts. Context may include any context describing content, and may be determined in any suitable manner, such as via one or more machine learning models. Such machine learning models may be any suitable machine learning models, and may include for example convolutional neural networks (CNNs) or other neural networks trained to classify one or more subjects of an image, identify objects in the image, or identify any other potential contexts in any manner.

Nearby devices may be selected by any other electronic device or computer. Also, this electronic device or computer may select nearby devices in any manner, including by location and according to whether they share the same network. This network may be any electronic communications network that facilitates communication between or among any one or more electronic devices, including networks such as a local area network (LAN), a personal area network (PAN), a wireless ad hoc network (WANET), or a mobile ad hoc network (MANET).

It is noted that the determination of environmental parameters of generated content is not limited to any particular type of content or content generation system. For example, generated content may be extended reality content generated by, e.g., a virtual reality, augmented reality, or mixed reality device. In such an example, an extended reality system can generate content such as a video of a virtually-enhanced object. Other electronic devices having relevant parameters may then be determined, such as nearby IoT lights whose intensity parameters may have an impact on the content. Parameter values of these devices can be determined and appended to the generated extended reality content as metadata, so that replays of the extended reality content may include relevant devices and parameter values. Other users may thus more readily determine how extended reality content is made and, for example, reproduce the content if desired.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for determining parameters including settings of devices that may have influenced generated content, and appending values of these parameters to the generated content for the benefit of other users. Devices near the location at which the content was generated may be selected, and parameter values of these devices may be retrieved. These device parameters are often relevant to the generated content. Accordingly, the retrieved parameter values may be appended to the generated content for transmission along with the content. In this manner, other users may view both the content and the parameters of nearby devices that may have influenced the content, assisting users in, for example, recreating the content or its subject matter for themselves.

Figure 1:
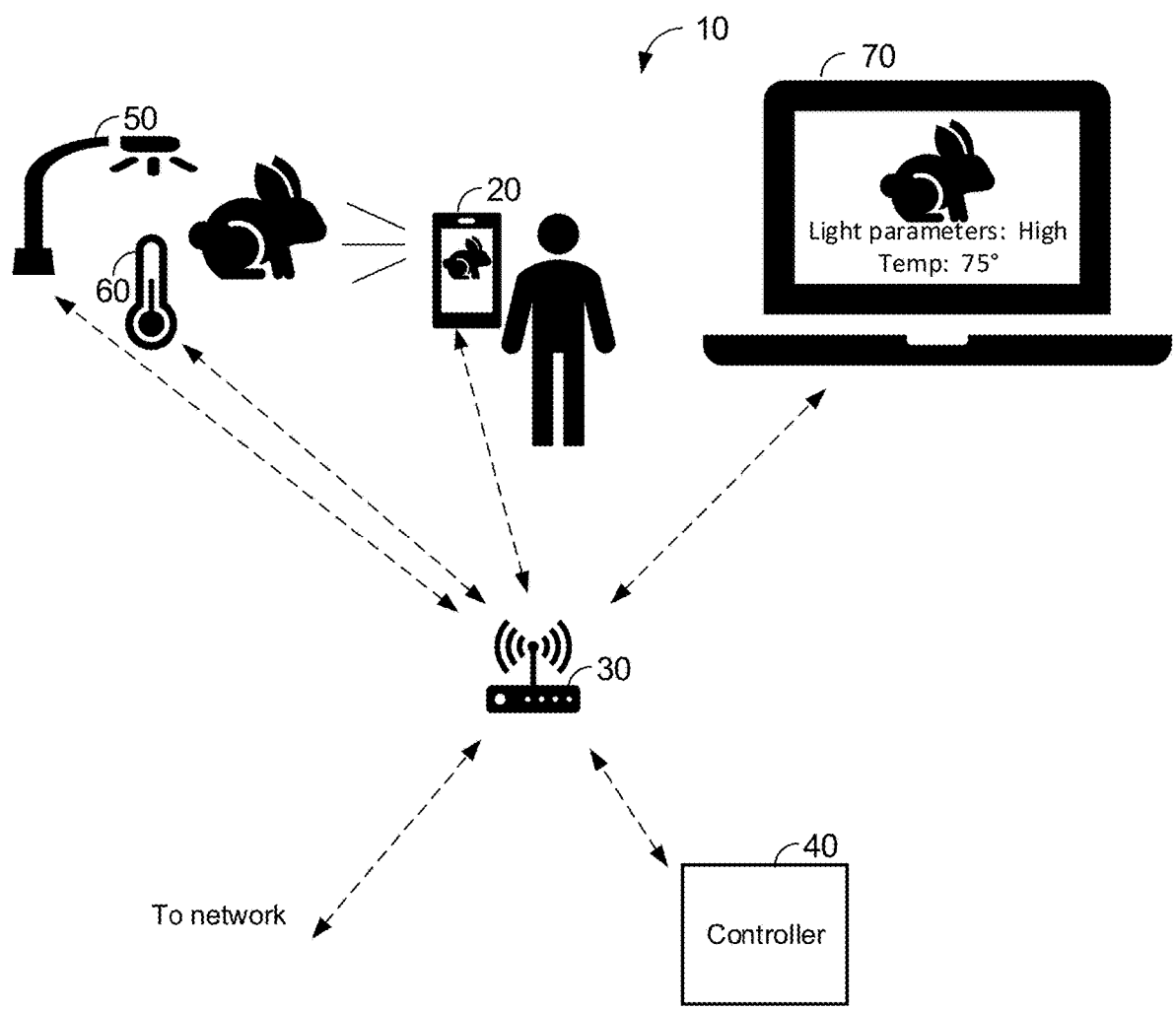
FIG. 1 illustrates exemplary operation of a system for selecting and appending creation parameters to generated content, in accordance with one embodiment.

FIG. 1 illustrates exemplary operation of a system 10 for selecting and appending creation parameters to generated content, in accordance with embodiments of the disclosure. Here, in this example, a user witnesses an interesting rabbit in a surrounding, and generates content of it such as by taking a picture or a video with his or her electronic device 20. The device 20 transmits its generated picture or video to a controller 40 through the local network shared by both the controller 40 and device 20. In one embodiment, controller 40 can be any type of mobile device, computer, server or service. As one example, the device 20 may transmit its content to controller 40 via a modem 30.

Controller 40 then selects those devices near the generated content whose parameters including settings may be relevant to the content, and retrieves those parameters of these devices. In particular, controller 40 may determine that the subject matter of the content is an animal such as a rabbit, and may further determine that certain IoT devices on the same local network include a temperature sensor 60 and illumination source 50. The controller 40 may also determine that parameters relevant to a live rabbit or other animal would include both the ambient temperature and illumination level of nearby lights (which may act as heat sources, or regulate the sleep cycle of the rabbit). Accordingly, the controller 40 retrieves the parameters including settings or sensor information from the temperature sensor 60 and illumination source 50, e.g., the temperature registered by sensor 60 and any illumination or power level of light source 50.

The controller 40 then appends the retrieved parameters, e.g., the temperature registered by sensor 60 and the illumination or power level of light source 50, to the generated content as, for example, metadata. The content and its metadata may then be sent to any other user who wishes to see it. For example, the controller 40 may send the metadata-augmented picture or video of the rabbit to another computing device 70 on the same network, so that its user may see the picture/video of the rabbit along with its cage temperature and light setting. This assists other users in properly setting up their own rabbit cage if they so desire. In this manner, embodiments of the disclosure provide users useful supplemental information accompanying content, which provides users options they did not previously have, such as the option to recreate their own version of the content, or to simply learn more about the subject matter of the content if they are interested in doing so.

It is noted that any form of content is contemplated. In particular, while content discussed in connection with FIG. 1 is described as pictures or video, any other type of content is contemplated by embodiments of the disclosure. As nonlimiting examples, systems of embodiments of the disclosure may determine and append relevant parameter values for other forms of content such as audio content, or any type of extended reality content, including augmented reality (AR) content, virtual reality (VR) content, and mixed reality (MR) content. Thus, embodiments of the disclosure contemplate systems in which the electronic device 20 is an AR or a VR headset, where devices that may influence corresponding AR/VR content are selected and their device parameter values retrieved for appending to the AR/VR content.

Figure 2:
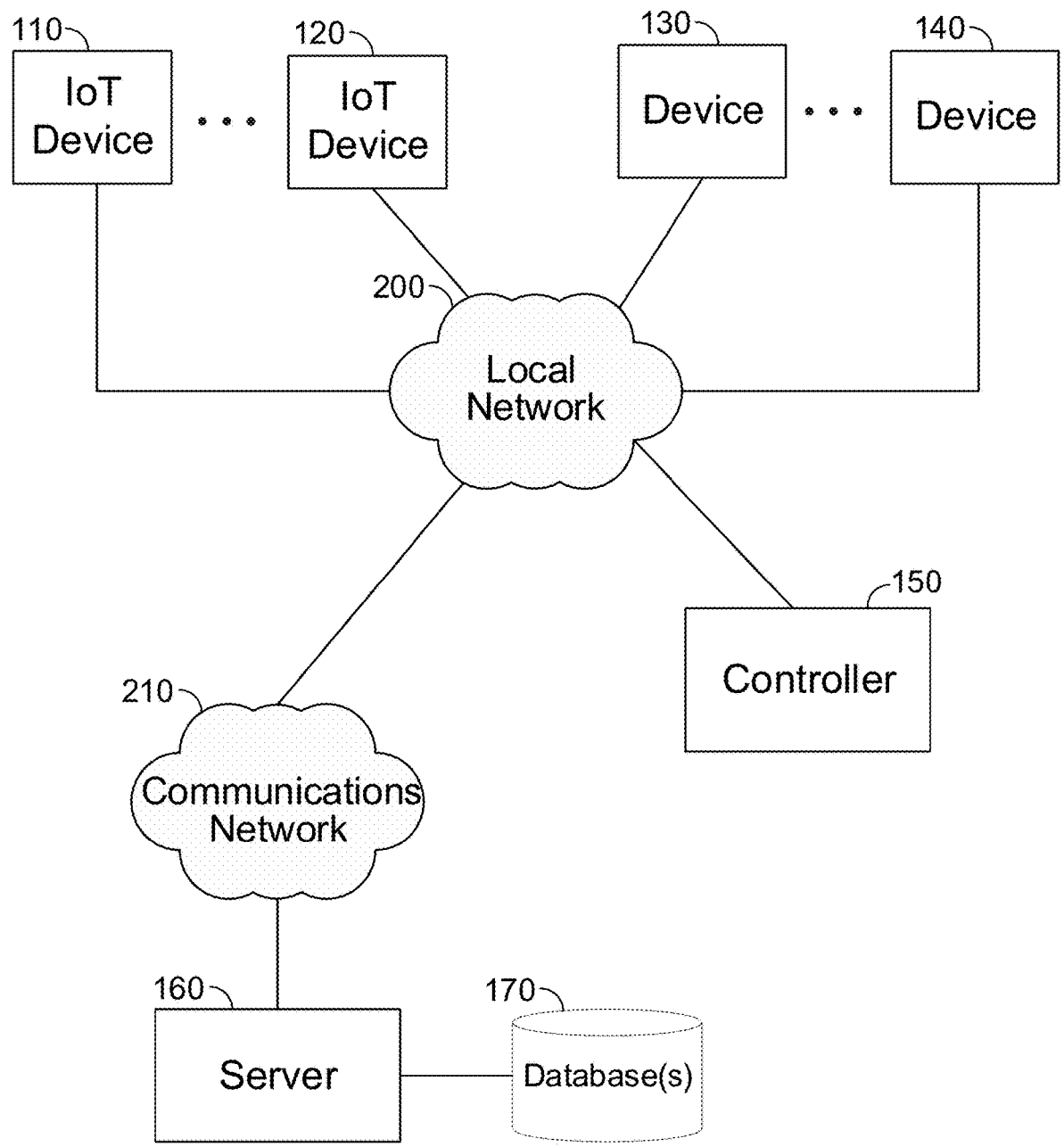
FIG. 2 is a block diagram illustration of a system for implementing the process of FIG. 1.

FIG. 2 is a block diagram representation of a system for selecting and appending creation parameters to generated content, presented for further illustration. Any number of content consumption and/or generation devices (or simply content devices) 130, 140 may be in communication with controller device 150 through, for example, a local network 200. Here, content devices 130, 140 may correspond to devices 20 and 70. Any number of content devices 130, 140 is contemplated. Local network 200 may include router 30.

Any number of IoT devices 110, 120 may also be connected to local network 200 to be discoverable by controller 150. IoT devices 110, 120 may be any device or mechanism having one or more sensors, such as for example network enabled cameras, microphones, sensors, actuators, or the like. Accordingly, IoT devices 110, 120 may include devices such as temperature sensors or thermostats, illumination sensors or adjustable lights, audio/video systems, actuated devices, smart appliances, monitoring systems, and the like.

The controller device 150, which corresponds to controller 40, is shown as being in electronic communication with IoT devices 110, 120 and content devices 130, 140 through local network 200, e.g., through a router such as router 30. Alternatively, controller device 150 may be a stand-alone device that is in communication with devices 130, 140 via direct wired or wireless connection or via a different network such as communications network 210. Controller device may be, for example, an electronic personal assistant, or any other electronic computing device such as a desktop, laptop, tablet computing device, or the like.

As one example, the IoT devices 110-120, content devices 130-140, local network 200 (e.g., router 30), and controller 150 may all be situated within a local area, e.g., within the same vehicle, or within various rooms of a home or office, and may together comprise a LAN, PAN, WANET, MANET, or any other type of electronic communications network. The server 160 may be a remotely located server, and the communications network 210 may be the public Internet. Server 160 may execute any operations instructed by controller 150, including any of the parameter selecting and appending operations described below, and may retrieve and store various information, such as parameters, IoT device identification, and content with appended parameters, from or in one or more databases 170 in electronic communication with controller 150.

Figure 3:
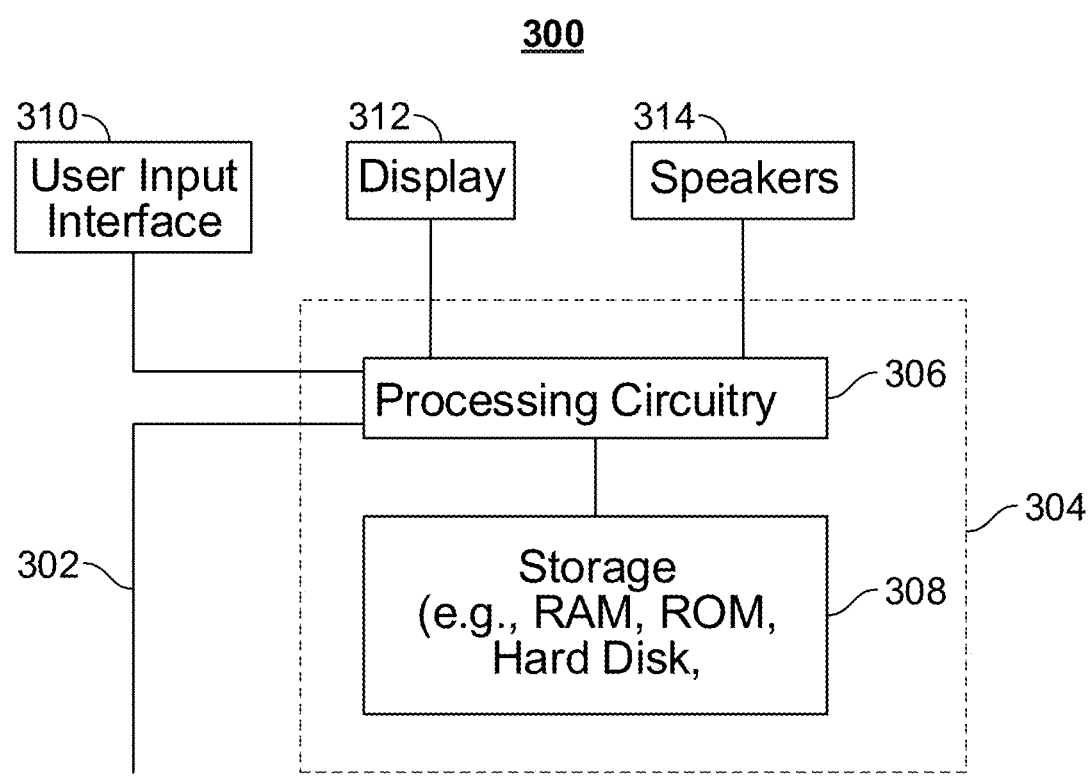
FIG. 3 is a generalized embodiment of an illustrative user equipment device constructed for use according to one embodiment.

The devices 130-140, e.g., devices 20 and 70, may be any devices capable of generating and/or displaying content for users. For example, devices 130, 140 may be digital TVs, laptop computers, smartphones, tablet computers, AR/VR/MR headsets or displays, or the like. FIG. 3 shows a generalized embodiment of an illustrative device 300, e.g., a content device 130, 140. Device 300 may receive content and data via input/output (hereinafter "I/O") path 302. I/O path 302 may provide content (e.g., broadcast programming, on-demand programming, Internet content, content available over a LAN or a wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers 150 to stream and display content.

Control circuitry 304 may thus include communications circuitry suitable for communicating with a content provider 150 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
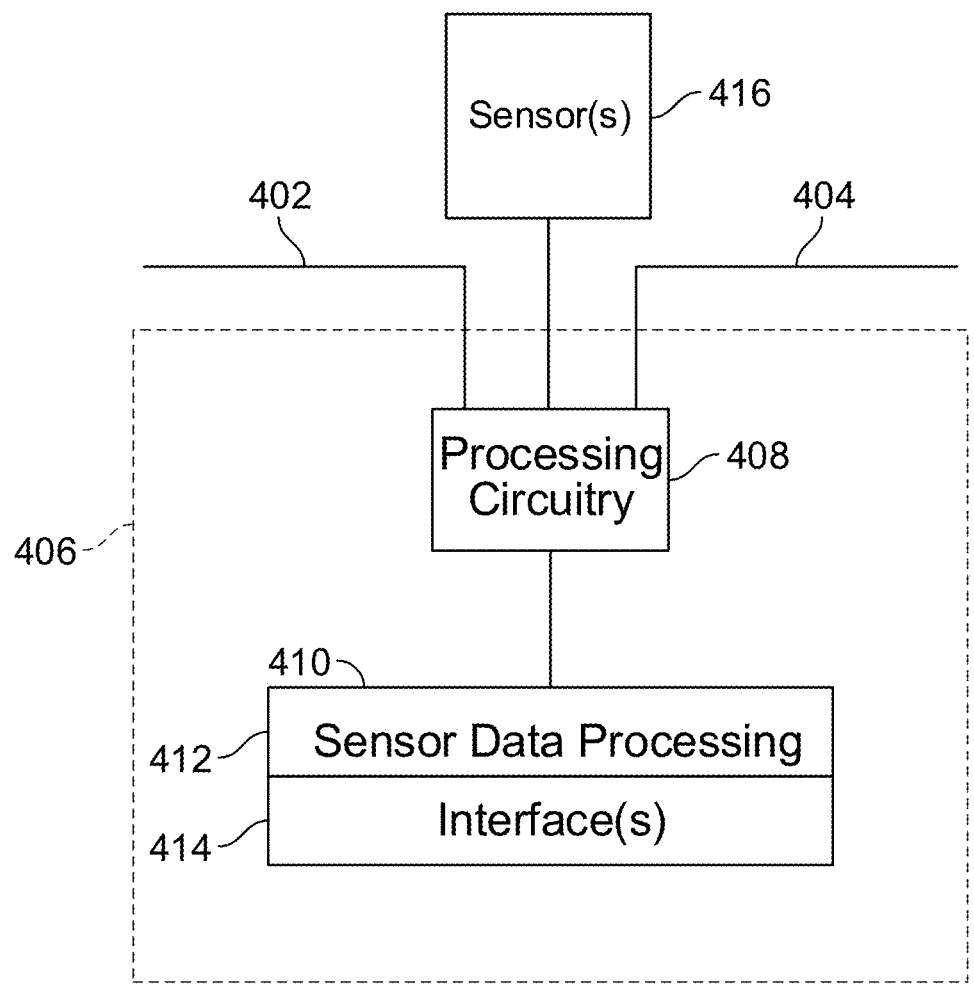
FIG. 4 is a generalized embodiment of an illustrative IoT device constructed for use according to one embodiment.

FIG. 4 is a generalized embodiment of an illustrative IoT device constructed for use according to embodiments of the disclosure. Here, device 400 may serve as an IoT device 130 or 140. Device 400 may receive content and data via I/O paths 402 and 404. I/O path 402 may provide data to any other devices to which it can communicate via local network 200, while I/O path 404 may provide data to, and receive instructions from, one or more devices such as controller 150. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300. Device 400 may also have one or more sensors 416 in electronic communication with processing circuitry 408. Sensors 416 may be any IoT sensors, such as temperature sensors, light sensors, microphones, or any other sensor for detecting any quantity or property. Device 400 may also have other components, such as actuators, speakers, etc., which are not shown but which may be present.

Storage 410 is a memory that stores a number of programs for execution by processing circuitry 408. In particular, storage 410 may store a sensor data processing module 412 that controls operation of sensors 416 and conditions and processes its output data. Storage 410 may also store one or more interfaces 414 for handling the exchange of data and/or instructions with any other devices of local network 200.

The device 400 may be any IoT device capable of communication with devices of network 200. For example, the device 400 may be an IoT appliance, IoT mechanism or machine, or any networked computing device with one or more sensors. The device 400 may alternatively be a laptop computer or desktop computer configured as above. Device 400 may be a stand-alone device, or its functionality may be incorporated into any other device, such as any of the other devices 130, 140, or 150.

Figure 5:
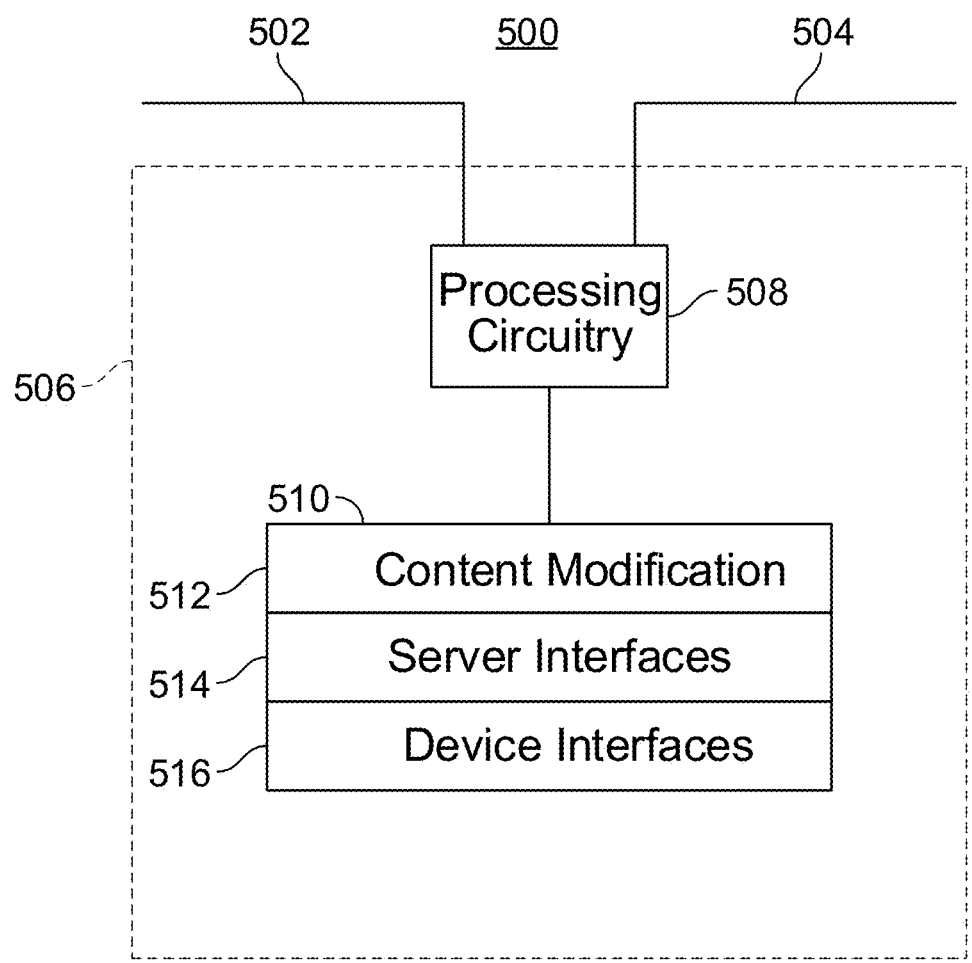
FIG. 5 is a generalized embodiment of an illustrative controller device constructed for use according to one embodiment.

FIG. 5 is a generalized embodiment of an illustrative controller device 150 constructed for use according to embodiments of the disclosure. Here, device 500 may be a more detailed example of controller device 150. Device 500 may be a device on local network 200 which determines environmental parameters of generated content, and appends these parameters to the generated content as metadata. Device 500 may receive content and data via I/O paths 502 and 504. I/O path 502 may provide content and data to devices such as display 20, while I/O path 504 may provide data to, and receive content from, one or more content providers 150. Like the user equipment device 300, the device 500 includes processing circuitry 508 and storage 510. The processing circuitry 508 and storage 510 may be constructed, and may operate, in similar manner to the respective components of user equipment device 300.

Storage 510 stores various data and programs for execution or use by processing circuitry 508, including content modification programs 512, server interfaces 514, and device interfaces 516. The content modification modules 512 are any sets of instructions for identifying appropriate IoT devices and retrieving their relevant parameters, and appending them to content as metadata. Server interfaces 514 are interface programs for handling the exchange of commands and data with one or more servers 160. Device interfaces 516 are interface programs for handling the exchange of commands and data with IoT devices 110, 120.

Figure 6:
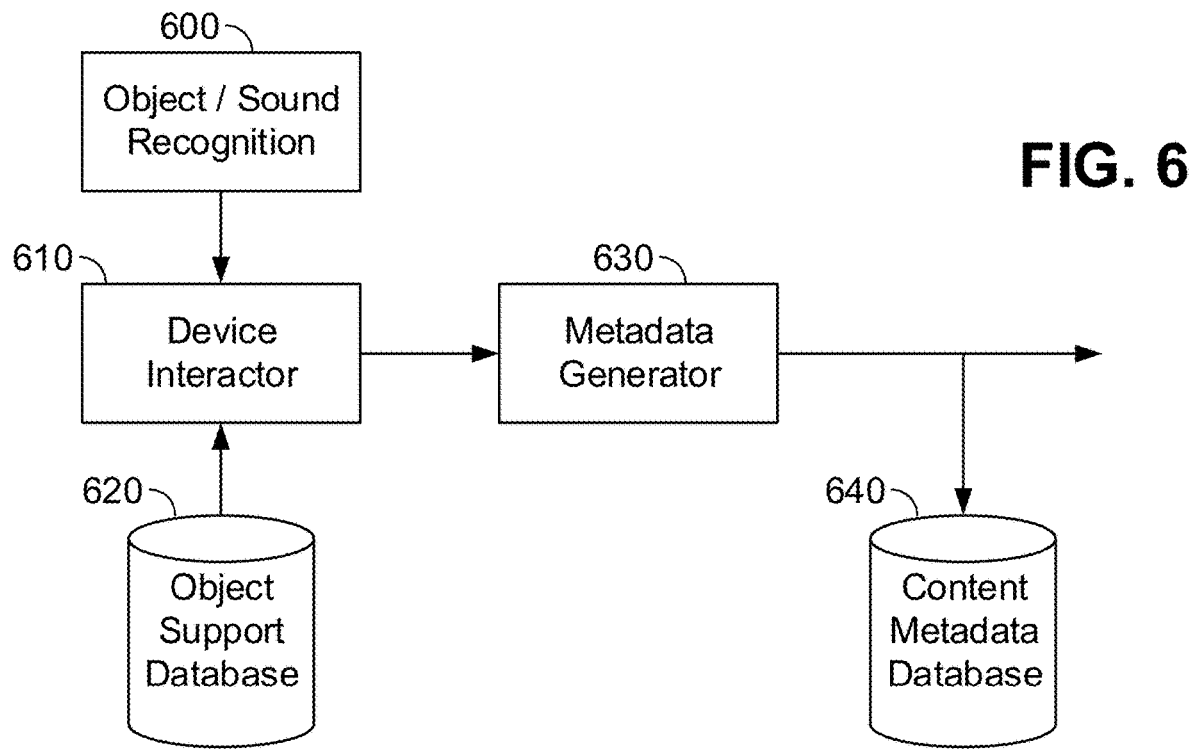
FIGS. 6-7 are block diagrams illustrating systems and operations for selecting and appending creation parameters to generated content, in accordance with one embodiment.

FIG. 6 is a block diagram illustrating a process for retrieving device parameters and appending the parameters to generated content, according to embodiments of the disclosure. Blocks of FIG. 6 represent instruction modules that each can be implemented in any one or more of the various devices shown in FIG. 2, e.g., as modules of controller device 500, server 160, and/or databases 170. When a device 130, 140 generates content such as by taking a photograph or video, an object/sound recognition engine 600 of content modification programs 512 may retrieve the generated content, identify its type (e.g., photo, video, audio file, etc.), and search object support database 620 to determine nearby IoT devices 110, 120. Content type identification may be accomplished in any manner. For example, object/sound recognition module 600 may identify content by its file extension (e.g., files with a .avi, .gif, .mov extension or the like may be designated as video files, while files with a .jpg, .tif, .bmp extension or the like may be designated as picture files, etc.). Object/sound recognition module 600 may identify generated content in any suitable manner.

Object support database 620 may be a database storing identifiers of each IoT device 110, 120 in communication with local network 200, and may be maintained by and implemented in any electronic computing device. For example, object support database 620 may be implemented in storage 510 of controller device 500, may be one of databases 170, may be implemented in server 160, or the like. As one example, controller device 500 may be in communication with a router 30 of network 200 to retrieve address and identification information for each IoT device 110, 120 registered with the network 200, and may store this address and identification information in its object support database 620.

Once object/sound recognition module 600 identifies the generated content from device 130, 140 and determines nearby IoT devices 110, 120, it passes this information to device interactor 610, which may also be implemented as a module within content modification programs 512. Device interactor 610 instructs the IoT device interfaces 516 of controller 500 to determine whether the IoT devices 110, 120 were involved in the generation of the content, e.g., whether they were on at the time indicated by the content timestamp, and if so, queries the support database 620 to retrieve any relevant parameters for each device 110, 120 involved. To accomplish this, database 620 may maintain a list of the parameters for each IoT device 110, 120, generated in any manner. To generate this list, object/sound recognition module 600 may query each device 110, 120 on network 200 to determine the parameters of each, or may maintain a list of common IoT devices and their parameters. Alternatively, device interactor 610 may simply query each IoT device 110, 120 found in database 620 for its parameters and their values at the time of content creation. Object/sound recognition module 600 may generate such a list in any suitable manner.

Parameters may also be selected in any manner. Device interactor 610 may simply retrieve every parameter of each nearby IoT device 110, 120. Alternatively, device interactor 610 may determine relevant parameters according to the generated content. For example, device interactor 610 may determine a subject matter or context of the generated content, such as by using one or more machine learning models to select and identify dominant objects within content. Such machine learning models are known, and include models such as CNNs for identifying objects and/or contexts of pictures, video, and the like. Once these objects and/or contexts are identified, device interactor 610 may identify relevant parameters of IoT devices 110, 120 in any manner. As one example, device interactor 610 may store a table of object types or contexts, and corresponding relevant parameters for each IoT device 110-120, or may employ one or more known machine learning models trained to determine relevant parameters of various objects/contexts. Device interactor 610 may then retrieve the determined parameter values from IoT devices 110, 120.

The device interactor 610 then passes the generated content and relevant parameter values to metadata generator 630, which may be implemented within content modification programs 512. The metadata generator 630 generates metadata for the generated content, where the generated metadata contains the parameter values received from device interactor 610. The metadata generator 630 appends this metadata to the content, stores the content with its associated metadata in content metadata database 640, and may also transmit the content with its associated metadata to any other program or device as desired. For instance, metadata generator 630 may return the content with its metadata to the device 130, 140 that generated the content, or may transmit the content and its metadata to any other device 70 for display to users.

Figure 7:
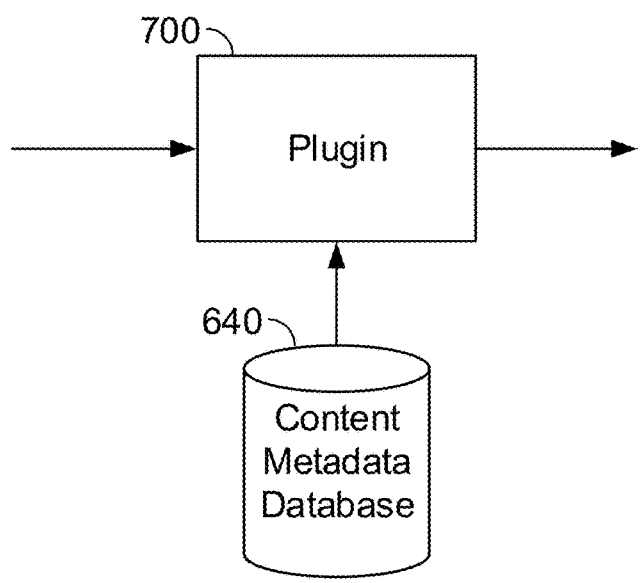

FIG. 7 is a block diagram illustrating a process for transmitting modified content as desired by users. When modified content is to be sent to users, such as when users request such modified content or when system 10 deems it appropriate to push such content to a user, a plugin 700 may retrieve the modified content from content metadata database 640 and send it to the appropriate device or destination. Plugin 700 may be any code module configured to retrieve and transmit identified content and its associated metadata as desired, and may be implemented within any other program or module, e.g., as part of content modification programs 512, within one or more applications of device 300, within server 160, or any other electronic computing device that may communicate with network 200.

Figure 8:
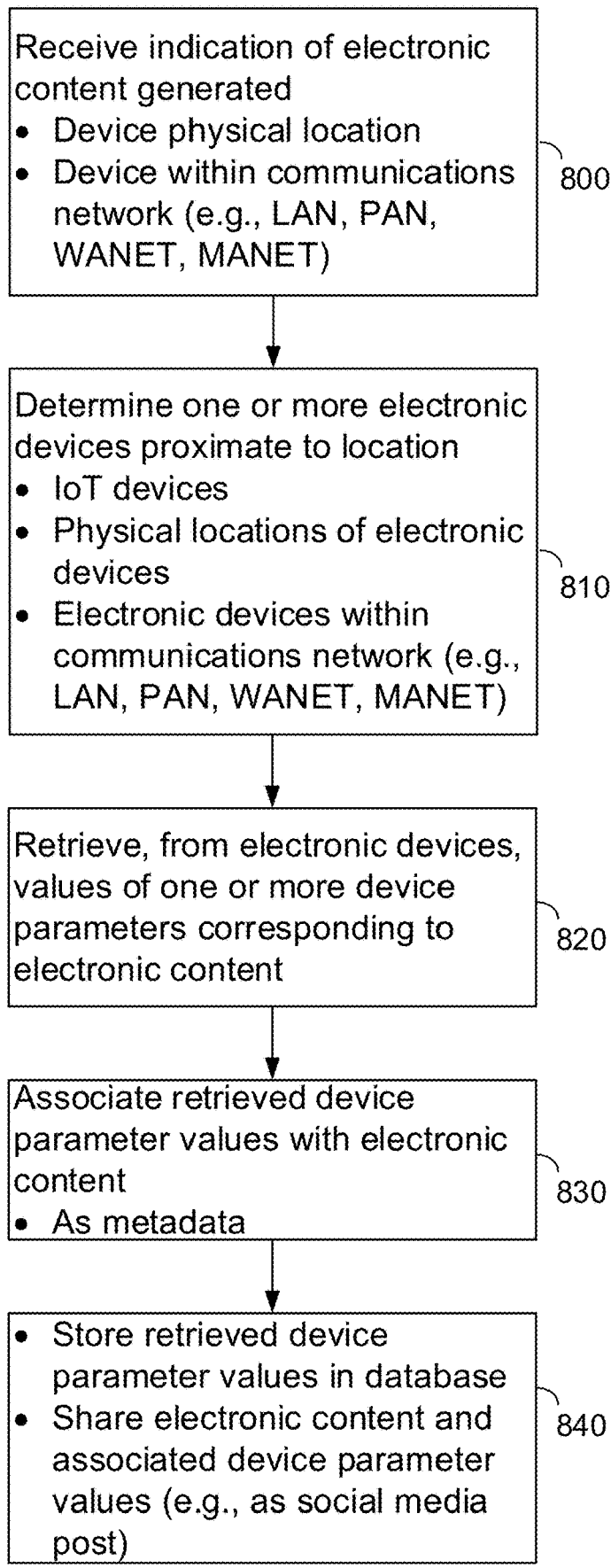
FIG. 8 is a flowchart illustrating process steps for augmenting generated content with associated creation parameters, in accordance with one embodiment.

FIG. 8 is a flowchart illustrating process steps for augmenting generated content with associated creation parameters, in accordance with embodiments of the disclosure. In some embodiments, the process steps of FIG. 8 further describe the processes of FIGS. 6-7. Here, controller device 150 may receive an indication of electronic content generated by a device such as devices 130, 140 (Step 800). As above, devices 130, 140 may generate any type of content in any manner, such as by taking pictures, recording audio and/or video, and the like. Controller device 150 may query devices 130, 140 on its network 200 to determine the presence of recently generated content, or devices 130, 140 may alert the controller device 150 when they generate content.

Controller device 150 may then determine the location of the device 130, 140 that generated this content, either by explicit determination of device 130, 140 location in any manner, such as by querying device 130, 140 for its global positioning system (GPS) location, or by implicit determination that the device 130, 140 is also on network 200 (e.g., within the same network, whether that network is a LAN, PAN, WANET, MANET, or any other type of electronic communications network). Controller device 150 then determines one or more electronic devices proximate to the device 130, 140 that generated the content (Step 810). These electronic devices may be IoT devices 110, 120 whose parameters may have influenced the content in some way. Determination of these IoT devices 110, 120 may occur in any manner, such as by determination of the physical locations of nearby IoT devices 110, 120 (whether by GPS location or otherwise), or by selection of those IoT devices 110, 120 that are within the same communications network as the device 130, 140 that generated the content.

Once controller 150 determines those IoT devices 110, 120 that are proximate to the device 130, 140 that generated the content, controller 150 retrieves from those IoT devices 110, 120 one or more device parameter values corresponding to the generated content (Step 820). This Step 820 may be carried out as in FIG. 6 above, with object/sound recognition engine 600 receiving the generated content, identifying its type, and retrieving identifiers of nearby IoT devices 110, 120 from object support database 620. As above, the content and identifications of nearby IoT devices 110, 120 are then sent to device interactor 610, which determines those IoT devices 110, 120 that may have influenced the generated content, determines their appropriate parameters, and retrieves their parameter values.

The controller 150 then associates the retrieved device parameters with the generated electronic content (Step 830). As above, the parameter values determined by device interactor 610, and associated content, are sent to metadata generator 630, where the parameters are appended to the content as, e.g., metadata. The retrieved device parameters may then be stored in a database such as content metadata database 640 (Step 840), where they may be retrieved for transmission to another device as desired. For example, the generated content and its associated settings or parameters may be retrieved by plugin 700 and transmitted to a social media server or device for sharing, such as by sharing a social media post.

Figure 9:
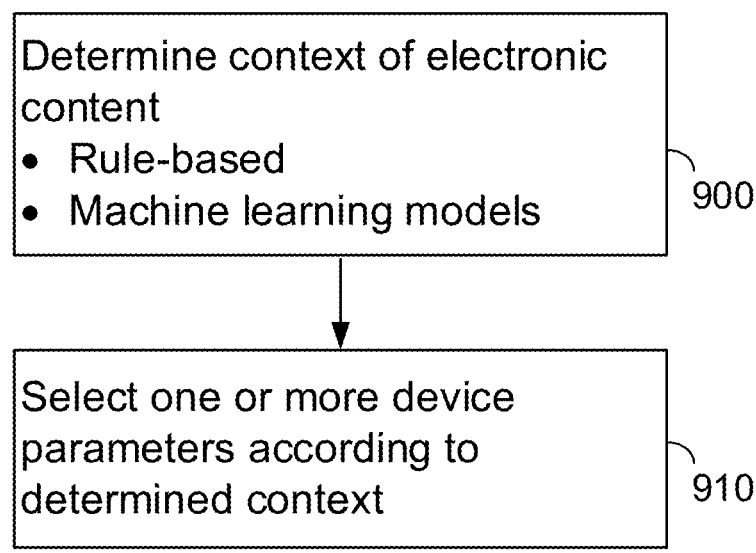
FIG. 9 is a flowchart illustrating process steps for determination of contexts for generated content, in accordance with one embodiment.

As above, appropriate parameters of IoT devices 110, 120 may be identified in any manner, such as by first identifying a context of the generated content and then identifying those IoT device 110, 120 parameters appropriate to this context. FIG. 9 is a flowchart illustrating process steps for determination of contexts for generated content, in accordance with embodiments of the disclosure. In some embodiments of the disclosure, the process steps of FIG. 9 may be carried out within Step 820 of FIG. 8. In particular, once it receives the generated electronic content from a device 130, 140, controller 150 may determine a context of the content (Step 900). As above, one or more objects may be identified within the content, such as by one or more machine learning models. The context may then be determined in any manner, such as via a rule-based approach in which controller 150 or another device maintains a table of objects and corresponding contexts or a set of rules associating predetermined contexts with certain objects. Alternatively, as above, controller 150 may employ one or more machine learning models to associate contexts with identified objects.

Once a context has been determined for the generated content, controller 150 selects one or more device parameters according to the determined context (Step 910). As above, controller 150 may implement a device interactor 610 to identify relevant parameters of IoT devices 110 via, for example, a table of object types or contexts, and corresponding relevant parameters for each IoT device 110-120. As another example, device interactor 610 may employ one or more known machine learning models trained to determine relevant parameters of various objects/contexts. Device interactor 610 may then retrieve the determined parameter values from IoT devices 110, 120.

Figure 10:
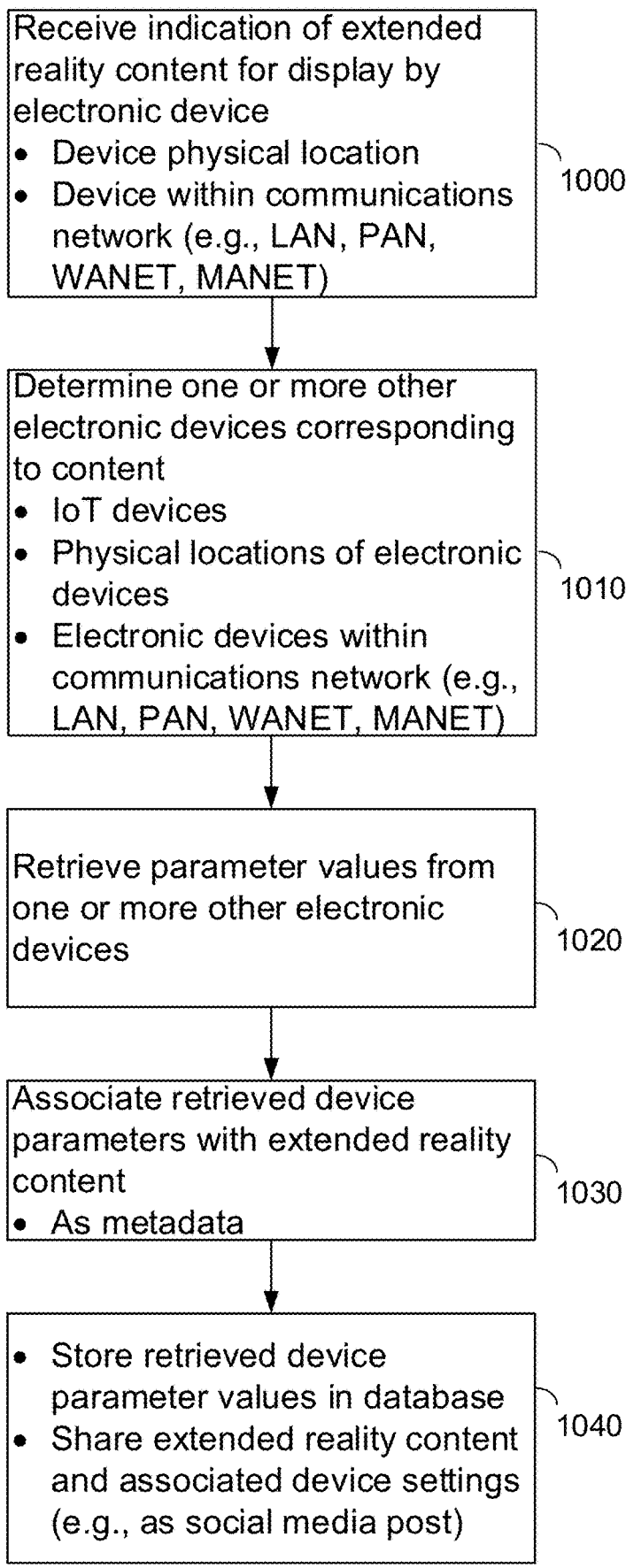
FIG. 10 is a flowchart illustrating process steps for augmenting extended reality content with associated creation parameters, in accordance with one embodiment.

As above, embodiments of the disclosure may be applied to any type of content, including extended reality content such as any content for use with any AR, VR, or MR systems. FIG. 10 is a flowchart illustrating process steps for augmenting extended reality content with associated creation parameters, in accordance with one embodiment. Here, controller device 150 may receive an indication of extended reality content for display by a device such as devices 130, 140, which may be any extended reality content display or generation devices (Step 1000). Controller device 150 may then determine one or more other electronic devices corresponding to this extended reality content (Step 1010). As above, controller device 150 may determine the location of the device 130, 140 that generated this content, either by explicit determination of device 130, 140 location in any manner, such as by querying device 130, 140 for its global positioning system (GPS) location, or by implicit determination that the device 130, 140 is also on network 200 (e.g., within the same network, whether that network is a LAN, PAN, WANET, MANET, or any other type of electronic communications network). Controller device 150 may then determine one or more electronic devices proximate to the device 130, 140 that generated the content. These electronic devices may be IoT devices 110, 120 whose parameters may have influenced the content in some way. Determination of these IoT devices 110, 120 may occur in any manner, such as by determination of the physical locations of nearby IoT devices 110, 120 (whether by GPS location or otherwise), or by selection of those IoT devices 110, 120 that are within the same communications network as the device 130, 140 that generated the content.

Once controller 150 determines those IoT devices 110, 120 that are proximate to the site of content generation, controller 150 retrieves from those IoT devices 110, 120 one or more device parameter values corresponding to the generated content (Step 1020). This Step 1020 may be carried out as in FIG. 6 above, with object/sound recognition engine 600 receiving the generated extended reality content, identifying its type, and retrieving identifiers of nearby IoT devices 110, 120 from object support database 620. As above, the content and identifications of nearby IoT devices 110, 120 are then sent to device interactor 610, which determines those IoT devices 110, 120 that may have influenced the generated content, determines their appropriate parameters, and retrieves their parameter values.

The controller 150 then associates the retrieved device parameters with the generated extended reality content (Step 1030). As above, the parameter values determined by device interactor 610 and associated content are sent to metadata generator 630, where the parameters are appended to the content as, e.g., metadata. The retrieved device parameters may then be stored in a database such as content metadata database 640 (Step 1040), where they may be retrieved for transmission to another device as desired. For example, the generated content and its associated settings or parameters may be retrieved by plugin 700 and transmitted to a social media server or device for sharing, such as by sharing a social media post. As another example, the extended reality content and its associated parameter values may be transmitted to another extended reality display for display to a requesting user, where display may optionally include display of the associated parameter values, allowing users to see the conditions present during content generation.

As an illustrative example, embodiments of the disclosure contemplate systems for which users wearing a VR or AR headset may record video of an object in their perceived virtual or augmented environment. Systems of the disclosure may then determine nearby IoT devices whose parameters may have contributed to the video in some manner, such as nearby lights, speakers, heating/cooling systems, appliances, or the like, and retrieve relevant parameter values from each. Parameter values may then be associated with the VR/AR content, so that others may display the content and see these values, allowing them to, for example, recreate the content for themselves if they wish.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, IoT devices that may have influenced the generated content may be selected in any manner, whether by location, by presence on the same communications network, or in any other manner. Similarly, location may be a determined physical location, a presence on the same communications network, or any other approach by which it may be estimated that an IoT device may have influenced generated content. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of obtaining parameters associated with extended reality content, the method comprising:
   receiving, at a controller, an indication of extended reality content for display by a user device;
   determining, at the controller, one or more other electronic devices corresponding to the extended reality content;
   retrieving, at the controller, values of parameters of the one or more other electronic devices, wherein the retrieved device parameters comprise blind open/close settings;
   associating the retrieved device parameter values with the extended reality content; and storing the retrieved device parameter values associated with the extended reality content in a database.

2. The method of claim 1, wherein the method further comprises transmitting the extended reality content and the associated retrieved device parameter values to one or more additional electronic devices.

3. The method of claim 2, wherein the transmitting further comprises sharing the extended reality content and the associated retrieved device parameter values as a social media post.

4. The method of claim 1, further comprising determining a context of the extended reality content, and selecting the one or more device parameter values according to the determined context.

5. The method of claim 4, wherein the determining a context further comprises determining the context using one or more machine learning models.

6. The method of claim 1, wherein the one or more other electronic devices comprise one or more Internet of Things devices.

7. The method of claim 1, wherein the controller is configured for electronic communication with the one or more other electronic devices over an electronic communications network.

8. The method of claim 7, wherein the other electronic devices are devices of the electronic communications network.

9. The method of claim 1, wherein the extended reality content is augmented reality (AR) content, virtual reality (VR) content, or mixed reality (MR) content.

10. The method of claim 1, wherein the associating further comprises associating the retrieved device parameter values as metadata of the electronic content.

11. The method of claim 1, further comprising:
retrieving the stored device parameter values from the database; and
transmitting at least one of the stored device parameter values and the extended reality content for display of the at least one of the stored device parameters along with display of the extended reality content.

12. A system for obtaining parameters associated with extended reality content, the system comprising:
a storage device; and
control circuitry configured to:
receive, at a controller, an indication of extended reality content for display by user device;
determine, at the controller, one or more other electronic devices corresponding to the extended reality content;
retrieve, at the controller, values of parameters of the one or more other electronic devices, wherein the retrieved device parameters comprise blind open/close settings;
associate the retrieved device parameter values with the extended reality content; and
store the retrieved device parameter values associated with the extended reality content in a database.

13. The system of claim 12, wherein the control circuitry is further configured to transmit the extended reality content and the associated retrieved device parameter values to one or more additional electronic devices.

14. The system of claim 13, wherein the transmitting further comprises sharing the extended reality content and the associated retrieved device parameter values as a social media post.

15. The system of claim 12, wherein the control circuitry is further configured to determine a context of the extended reality content, and selecting the one or more device parameter values according to the determined context.

16. The system of claim 15, wherein the determining a context further comprises determining the context using one or more machine learning models.

17. The system of claim 12, wherein the one or more other electronic devices comprise one or more Internet of Things devices.

18. The system of claim 12, wherein the controller is configured for electronic communication with the one or more other electronic devices over an electronic communications network.

19. The system of claim 18, wherein the other electronic devices are devices of the electronic communications network.

20. The system of claim 12, wherein the extended reality content is augmented reality (AR) content, virtual reality (VR) content, or mixed reality (MR) content.

21. The system of claim 12, wherein the associating further comprises associating the retrieved device parameter values as metadata of the electronic content.

22. The system of claim 12, wherein the control circuitry is further configured to:
retrieve the stored device parameter values from the database; and
transmit at least one of the stored device parameter values and the extended reality content for display of the at least one of the stored device parameters along with display of the extended reality content.

* * * * *